United States Patent [19]

Chakraborty et al.

[11] Patent Number: 4,874,513

[45] Date of Patent: Oct. 17, 1989

[54] DISPOSABLE FILTER UNIT WITH FILTER SUPPORT MEANS AT BOTH SIDES OF THE FILTER ELEMENT

[75] Inventors: Asok Chakraborty, Gottingen; Herbert Urlaub, Einbeck; Franz Grof; Klaus Cosack, both of Dassel, all of Fed. Rep. of Germany

[73] Assignee: Schleicher & Schuell GmbH, Fed. Rep. of Germany

[21] Appl. No.: 300,232

[22] Filed: Jan. 19, 1989

[30] Foreign Application Priority Data

Jan. 22, 1988 [DE] Fed. Rep. of Germany ....... 3801866

[51] Int. Cl.$^4$ .................... B01D 27/08; B01D 29/04
[52] U.S. Cl. ................. 210/321.84; 210/445; 210/446; 210/455; 55/492; 55/501; 55/503
[58] Field of Search .............. 210/321.75, 321.84, 210/445, 446, 455, 451, 453; 55/490, 492, 495, 503, 501, 510, 511

[56] References Cited

U.S. PATENT DOCUMENTS

| | | | |
|---|---|---|---|
| 3,782,083 | 1/1974 | Rosenberg | 210/445 |
| 3,929,648 | 12/1975 | Cuthbert | 210/445 |
| 4,225,440 | 9/1980 | Pitesky | 210/445 |
| 4,340,475 | 7/1982 | Kraus et al. | 210/321.84 |
| 4,404,006 | 9/1983 | Williams et al. | 210/445 |
| 4,501,663 | 2/1985 | Merrill | 210/321.84 |

Primary Examiner—Richard V. Fisher
Assistant Examiner—Wanda L. Millard
Attorney, Agent, or Firm—Lowe, Price, LeBlanc, Becker & Shur

[57] ABSTRACT

A disposable filter unit (1) comprises a two-part fluid-tight and pressure-resistant housing with funnel-shaped inlet and outlet connecting sleeves (3,20). Two filter supports (5,12) are fixed in a fluid-tight and form-locking manner within the housing, and the filter element fixed between the supports. The filter supports (5,12) are essentially circular grate-shaped plates including concentrically arranged coplanar circular webs (16) defining concentrically arranged circular gaps (19) therebetween and a centrally arranged baffle plate (17). The webs and plate are fixed at their back side, facing away from the filter element, with radially extending support webs (18).

5 Claims, 1 Drawing Sheet

DISPOSABLE FILTER UNIT WITH FILTER SUPPORT MEANS AT BOTH SIDES OF THE FILTER ELEMENT

The invention relates to a disposable filter unit, and, more particularly a filter unit providing support on both sides of a filter element.

BACKGROUND ART

Disposable filter units are commonly products of industrial mass manufacturing and are used in chemical, physical and pharmaceutical laboratories for the pressure filtration of liquids and gases.

The filter unit includes a filter element which is normally a filter diaphragm fixed (e.g. by welding) between two housing parts of a filter housing. The filter element is supported across its whole surface by filter support means which are formed inside the housing parts as a part of the housing.

A filter unit of this kind is known, for example, from German patent application DE 32 02 330.8 A1. The filter support means used in this filter unit comprises on its side facing the flat filter element a plain surface interrupted by a plurality of concentrically arranged circular channels, intersected by a group of radially extending channels partially extending into a respective connecting sleeve. The inner cross-section of the radially extending channels increases from the peripheral area of the filter housing to the centrally arranged connecting sleeve. However, though establishing good and uniformly distributed support characteristics across the whole surface of the filter element, the fluid flow through such a filter is throttled significantly inspite of the increasing cross-section of the radially extending channels. Filters of this kind can be used only for relatively low flow rates.

In contrast, significantly higher flow rates, with respect to the area of the filter element, can be achieved in a disposable filter unit known from U.S. Pat. No. 3,782,083. This filter unit is used only for the filtration of gases and the connecting sleeves therein expand continuously like a funnel forming a hyperbolic inner surface of the housing. Axial webs are formed at these inner surfaces and are radially star-type distributed, the radial edges of which webs are in the same plane supporting the filter element. However, a disadvantage of this filter unit is that it can be loaded only with low pressures in order not to damage the filter element by tearing.

SUMMARY OF THE INVENTION

It is an object of the present invention to provide a small disposable filter unit made of plastics which can be produced by methods of mass manufacturing.

Another object is to provide a filter unit including filter support structure for the filter element, especially a flat filter diaphragm, across its whole surface at both sides such that, on the one hand, high flow rates can be achieved and, on the other hand, high pressures for filtration can be applied without damaging the filter element.

To attain these objects, a disposable filter unit according to the present invention comprises the characteristic features. To attain these objects, a disposable filter unit according to the present invention comprises a pair of housing parts connected together wherein each housing part includes a centrally arranged connecting sleeve serving as one of an inlet for the fluid to be treated and an outlet for the filtrate, respectively. The unit also includes filter support means for supporting a filter element arranged between the filter support means. The filter support means includes a pair of grate shaped filter supports having concentrically arranged substantially coplanar circular webs and a baffle plate arranged centrally with respect to the webs and substantially coplanar therewith. Support webs extend radially to secure the circular webs and the baffle plate to each other. The support webs are fixed at a side of the filter support facing away from the filter element. A broad support area for the filter element is defined by a ring type web located peripherally about the support webs. The filter supports include lipped edges at the peripheral ring type web interlocking with each other in a fluid tight and form locking manner while simultaneously fixing the filter element between the filter supports. Peripheral edges of the housing parts include means for interlocking with each other in a fluid tight and form locking manner. The connecting sleeves have funnel shaped inlet and outlet fluid flow passages arranged such that the filter support means comes into contact with the housing supports only at peripheral edges thereof.

Thus, it is the essential idea of the present invention to provide small disposable plastic filter units, which particularly have an outer diameter in the range from 2 to 5 cm, with plate-type filter supports are manufactured separately and which are inserted in the housing of the filter unit such that the housing parts comprising the connecting sleeves can be formed continuously with hyperbolic interior funnels without interrupting the funnel-type inner surfaces of the housing with support means being a part of the housing.Thereby, that the filter support means are manufactured separately, and can be customized according to the characteristics of the filter element to attain optimum support of the filter element on the one hand and high fluid flow rates on the other hand. With respect to the characteristics of the injection molding process, the manufacturing process of the filter support means is totally independent from the manufacturing process of the housing parts such that the form of the mold and the taking out of the mold of the housing parts is not adversely influenced by the support means as otherwise occurs in prior art filter units.

It is another important aspect of the present invention that the fluid to be treated can expand across nearly the entire cross-sectional area of the filter supporting plate before reaching the filter support means facing the connecting sleeve serving as an inlet member, this filter support means thereby serves as a back-pressure filter, because of the at least essentially hyperbolic funnel-type expansion of the connecting sleeves of the two housing parts made of mechanically rigid and at least essentially chemically resistant plastics. The maximum pressure existing in the center of the fluid flow is reduced significantly such that the surface of the filter element is loaded more uniformly by the fluid to be filtered, which comes into contact with the filter element surface through the openings of the filter support means, and/or by the filter residues.

Surface of the filter element is therefore optimally utilized. The filter support means come into contact with the housing parts only at their edge areas.

The geometrical structure of the filter support means is a significant feature of the disposable filter unit according to the present invention. The pressure caused by the fluid streaming to the central area of the filter support means facing the connecting sleeve serving as an inlet member is reduced significantly by a centrally arranged baffle plate, in addition to the pressure reduction caused by the expansion of the cross-sectional area of the connecting sleeve serving as an inlet member; therefore the filter element is additionally centrally unloaded and protected against eroding influences.

The fluid reaches the filter element by passing through the essentially circular grate-shaped filter support means comprising concentrically arraged circular ring-type webs which are arranged in one and the same plane with a constant radial distance between each other and concentrically arranged circular gaps between the ring-type webs. The baffle plate is arranged in the center of these ring-type webs such that the surfaces of the ring-type webs and the baffle plate are coplanar forming the surface of the back-pressure filter or of the supporting area for the filter element.

At the sides facing away from the filter element, the ring-type webs and the baffle plate are fixed together with radially arranged support webs extending radially from the central axis.

According to another preferred embodiment of the disposable filter unit of the present invention, peripheral ring-type webs of the filter support means are formed such that the peripheral area of the filter element comprises a support area, to prevent bulging of the filter element at its edge areas within the effective filter area.

According to a further preferred embodiment of the disposable filter unit of the present invention, the peripheral edges of the peripheral webs are formed such that, on the one hand, they interlock with each other in a fluid-tight and form locking manner while simultaneously fixing the filter element cut to size, by which fact an improved security with respect to tightening facilities and undesirable creeping passages around the peripheral edge of the filter element for the fluid is achieved, and, on the other hand, they can be used for attaching the filter support means fluid-tightly to the two housing parts which have to comprise complementarily formed inner edges. In a similar manner, the peripheral edges of the two housing parts are interlock with each other in a fluid-tight and form locking, manner by which fact the pressure resistance in addition to the tightening facilities is also improved. Additionally, the fluid-tight form locking connection of the peripheral edges of the two housing parts is assured by a circular enclosing pressure resistant ring-type closing member formed by injection molding; the ring-type closing member may be colored for characterizing special features of the filter or special fields of applications.

A further useful embodiment of the disposable filter unit according to the present invention comprises hose liners with toroid bulges formed at the axial ends of the connecting sleeves serving as inlet or outlet members to facilitate the secure connection of inlet and outlet hoses connected to the sleeves.

A further advantage of the disposable filter unit, which is essentially formed symmetrically, that it can be used in both possible flow directions such that, is when mounting a filter unit, the direction of the filter is of no importance.

The ring-type gaps of the filter support means fixed inside the housing part comprising the outlet member for the filtrate act as drainage channels, by which fact the flow rate of the filtrate is sufficiently high such that the effective flow rates of the filter process may be enlarged.

BRIEF DESCRIPTION OF THE DRAWING

In the following, the present invention is explained in more detail with a special embodiment together with the accompanying drawings.

DETAILED DESCRIPTION OF THE DRAWING

Figure 1:
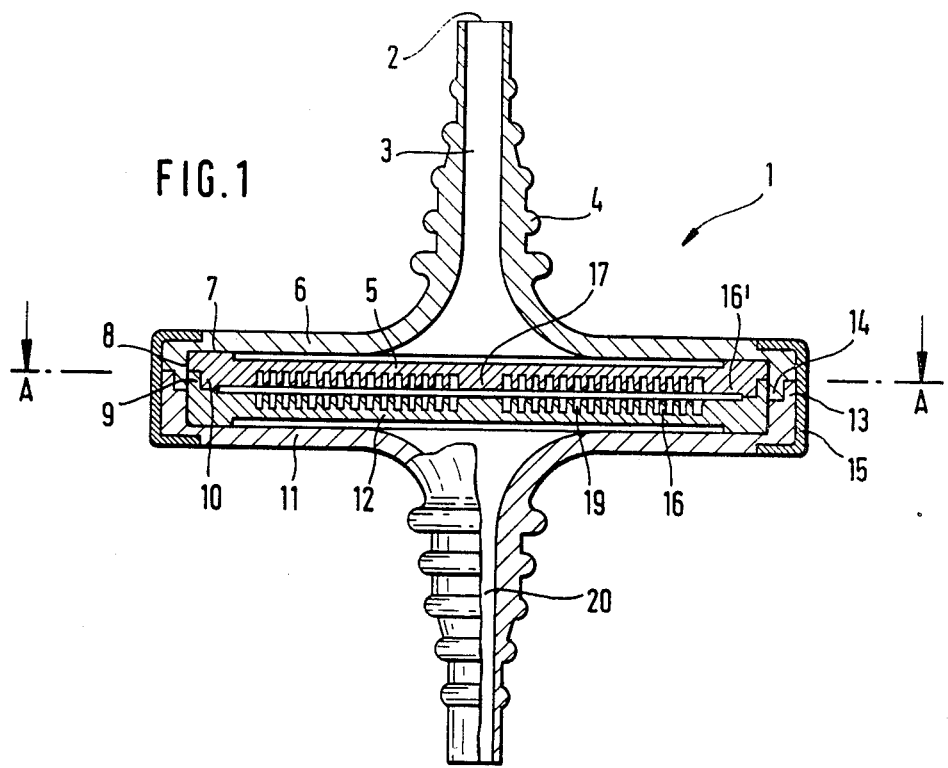
FIG. 1 is a schematic cross-sectional view of a first embodiment of a disposable filter unit according to the present invention.

The pressurized fluid is passed to the disposable filter unit 1 through opening 2 of connecting sleeve 3 which serves as an inlet member to the filter. A hose (not shown) is securely attached to sleeve 3 provided with toroid rings 4. Because of the essentially hyperbolic funnel-type shape of the inlet passage within connecting sleeve 3, the pressure of the fluid flow in the direction of the center of the filter support means 5 is reduced to a fraction of its original value. At the same time, the expansion of the inner cross-section improves the uniform distribution of the fluid to be filtered across the surface of the plate-type filter support means 5, achieving optimum utilisation of the filtrating surface of the filter element.

The filter support means 5 contacts the first housing part 6 only at its peripheral edges 7,8, and peripheral edge 8 is formed to connect both in a fluid-scaling and form-locking manner to the corresponding inner edge of the housing part 6, rigidly fixing filter support means 5 in the housing. Furthermore, the outer edge 8 is formed with a lip 9 overlapping a complementary shaped outer edge 10 of the filter support means 12 fixed in the second housing part 11 in the same fluid tight and form-locking, manner as support means 5. By that arrangement, the tightening characteristics of the disposable filter unit are improved and undesirable creep passages around the peripheral edge of the filter element for the fluid to be filtered are prevented. Additionally, the two housing parts 6,11 are connected by a circular pressure-resistant closing ring 15 (made by injection molding) enclosing the outer edges 13,14 of the housing parts 6,11, which outer edges 13,14 also interlock each other in a fluid-tight and form-locking, manner.

The filter support means 5,12 are essentially circular grate-shaped plates which comprise concentric ring-shaped webs 16, and and a baffle plate 17 arranged in the center of webs 16. Webs 16 and baffle plate 17 are connected by circumferentially spaced radially extending support webs 18 which are arraged at the backside of the filter support means, i.e., at that side which is not facing the filter element (see FIG. 2). The lower edges of the webs 16 and the baffle plate 17 are exactly coplanar. The filter element, which is not shown in the drawing, is fixed fluid-tightly between a peripheral web 16' of the filter support means 5,12 within the areas 18, while the bulging of the filter element caused by the fixing action is prevented by the broad support area of these ring-type webs 16'.

When the diameter of the disposable filter unit is about 50 mm, about 14 of said ring-type webs are provided. A certain part of the fluid flow streams centrally to the baffle plate 17 and is deviated laterally parallel to the filter element where it passes together with the remaining fluid flow distributed across the whole area of the filter support means through the ring-type gaps 19 between the ring-type webs 16 to the filter element. Additionally, the filter support means 5 acts like a back-pressure filter, too, which sufficiently presses the filter element to the filter support means 12. When having passed the filter element, the filtered fluid is passes through the filter support means 12 through the ring-type gaps 19 acting as drainage channels. Afterwards, the filtered through leaves the disposable filter unit 1 through the outlet connecting sleeve 20, corresponding in shape to the connecting sleeve 3, and through, for example, a hose connected thereto.

Figure 2:
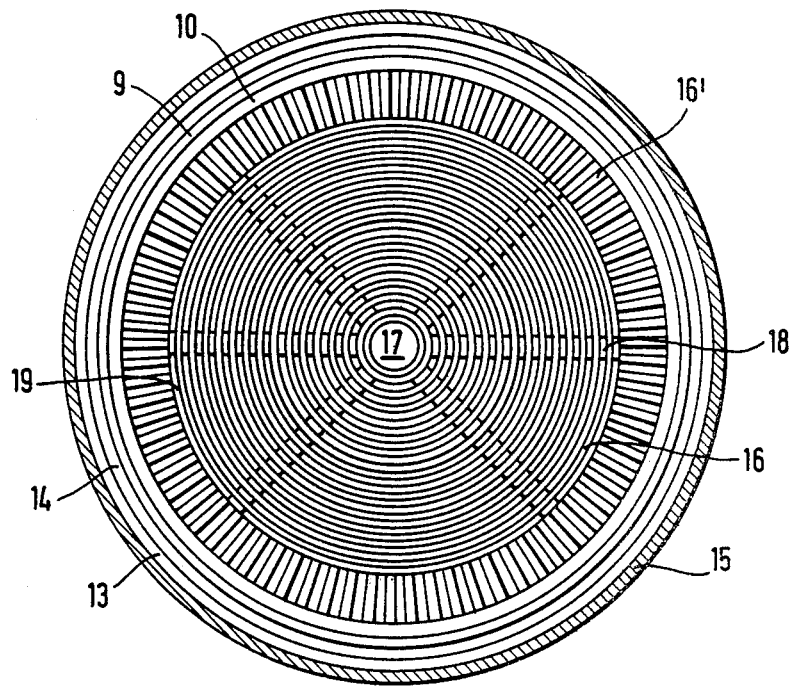
FIG. 2 is a sectional view taken of FIG. 1.

The embodiment of the disposable filter unit according to FIGS. 1 and 2 can be used for pressure filters with a diameter in the range of about 10 to 100 mm. Principally, the disposable filter unit can be used with smaller or larger diameters without any problems. The number of the ring-type webs 16, gaps 19 and radially extending webs 18 can be enlarged or decreased according to the respective diameter. It is only of significant importance that the filter element is sufficiently and uniformly pressed to the filter support means 12 and that the fluid can pass to the filter element or can leave the filter element, respectively, relatively unimpededly and uniformly.

We claim:

1. A disposable filter unit comprising a pair of housing parts connected together, wherein each housing part includes a centrally arranged connecting sleeve serving as one of an inlet for fluid to be treated and an outlet for the filtrate, respectively, a filter support means for supporting a filter element arranged betwen said filter support means, said filter support means including:

a pair of grate-shaped filter supports (5,12) having concentrically arranged substantially coplanar circular webs (16);

a baffle plate (17) arranged centrally with respect to the webs (16) and substantially coplanar therewith;

radially extending supports webs (18) to which webs (16) and the baffle plate (17) are fixed at a side of the filter support facing away from the filter element;

a broad support area defined by a ring-type web (16') located peripherally about the support webs;

said filter supports including lipped edges (9,10) at the peripheral ring-type webs (16') interlocking with each other in a fluid-tight and form locking manner while simultaneously fixing the filter element between the filter supports;

wherein peripheral edges (13,14) of the housing parts (6,11) including means for interlocking with each other in a fluid-tight and form locking manner, and said connecting sleeves (3,20) having funnel-shaped inlet and outlet fluid flow passages arranged such that the filter support means comes into contact with the housing parts (6,11) only at peripheral areas (7,8) thereof.

2. A disposable filter unit according to claim 1, further including locking means for foxing the filter support means (5,12) to both housing parts, respectively.

3. A disposable filter unit according to claim 1, further including a ring-shaped closing member (15) enclosing the peripheral edges (13,14) of the housing parts (6,11) in a pressure-resistant manner.

4. A disposable filter unit according to claim 1, said connecting sleeves (3,20) include toroid bulges (4) on outer surfaces thereof adapted to interfit with and secure inlet and outlet hoses to the filter unit.

5. A disposable filter unit according to claim 1, wherein the housing parts (6,11) and the filter support means (5,12) are made of plastics.

* * * * *